April 12, 1932.     B. E. SWAN     1,853,785

LOUPE ATTACHING MEANS

Filed Feb. 10, 1930

BIRGER E. SWAN
INVENTOR

BY *G. A. Ellestad*

ATTORNEY

Patented Apr. 12, 1932

1,853,785

UNITED STATES PATENT OFFICE

BIRGER E. SWAN, OF IRONDEQUOIT, NEW YORK, ASSIGNOR TO BAUSCH & LOMB OPTICAL COMPANY, OF ROCHESTER, NEW YORK, A CORPORATION OF NEW YORK

LOUPE ATTACHING MEANS

Application filed February 10, 1930. Serial No. 427,171.

This invention relates to optical devices and more particularly it has reference to a means whereby a magnifying lens or watchmaker's loupe may be attached to an eyeglass or spectacle frame. One of the objects of this invention is to provide a simple, detachable means which can be secured to the usual watchmaker's loupe for the purpose of supporting the loupe on an eyeglass or spectacle frame, thereby enabling a person to simultaneously use the loupe and a pair of spectacles. Another object is to provide a device of the character described which can be easily and cheaply manufactured. Other objects and advantages reside in certain novel features of construction, arrangement and combination of parts as will hereinafter be more fully described and pointed out in the appended claims.

Referring to the drawings.

Figure 2:
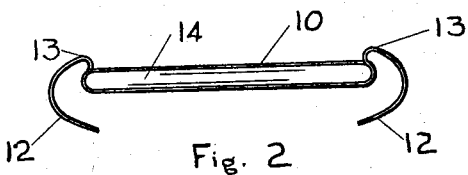
Fig. 2 shows a top plan view.
Figure 1:
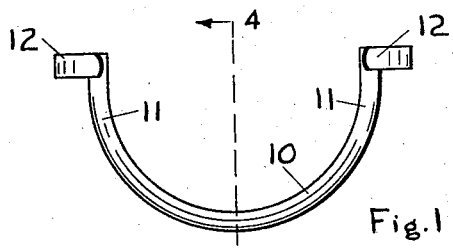
Fig. 1 shows a rear elevation of my improved device.
Figure 3:
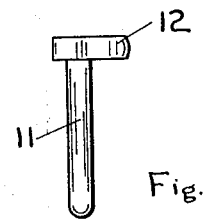
Fig. 3 shows an end elevation.
Figure 4:
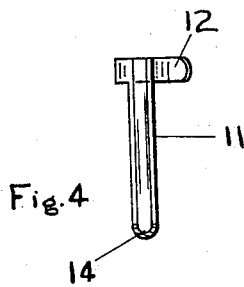
Fig. 4 shows a view taken on lines 4—4 of Fig. 1.

A preferred embodiment of my device, shown in the drawings, is preferably made from a single, flat stamping which is formed up to provide a substantially U-shaped member 10 having the two arms 11. At the end of each arm 11 there is an integral projection or finger 12 which has a reverse bend as shown at 13. The entire inner side of member 10 is formed to provide a groove 14 for a purpose to be hereinafter explained.

Figure 5:
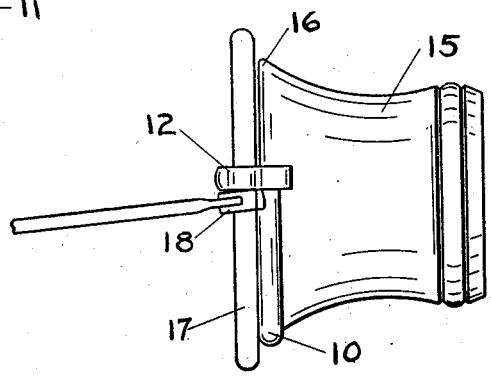
Fig. 5 shows my device in use.

In use, my device is attached to a watchmaker's loupe 15 by springing apart the resilient arms 11 so that the periphery 16 of the loupe will be seated in the groove 14, as illustrated in Fig. 5. The loupe may then be supported in front of a lens 17 of a pair of spectacles, with one of the fingers 12 resting on the endpiece 18 and the other finger resting on the mounting (not shown) adjacent the inner edge of the lens, as will be obvious to one skilled in the art. The fingers 12 can be adjustably bent to properly engage lenses and frames of various dimensions.

From the foregoing, it will be apparent that I am able to attain the objects of my invention and provide a simple device, of the character described, which can be readily attached to or detached from a watchmaker's loupe. Various modifications can obviously be made without departing from the spirit of my invention as pointed out in the appended claims.

I claim:

1. A device of the character described comprising a substantially U-shaped member having resilient arms, said member having an internal groove adapted to engage the periphery of a loupe, and an integral finger at the end of each arm, said fingers having reverse bends whereby they may adjustably engage a spectacle frame.

2. A device for attaching a watchmaker's loupe to a spectacle frame, said device comprising a substantially U-shaped member having resilient arms, said member having an internal groove adapted to engage the periphery of the loupe and an integral reversely bent attaching finger secured to the end of each arm.

BIRGER E. SWAN.